(12) United States Patent
Kobayashi et al.

(10) Patent No.: US 7,799,859 B2
(45) Date of Patent: Sep. 21, 2010

(54) SURFACTANT COMPOSITION

(75) Inventors: Kazushi Kobayashi, Arakawa-ku (JP); Koji Beppu, Arakawa-ku (JP)

(73) Assignee: Adeka Corporation, Tokyo (JP)

( * ) Notice: Subject to any disclaimer, the term of this patent is extended or adjusted under 35 U.S.C. 154(b) by 783 days.

(21) Appl. No.: 11/629,655

(22) PCT Filed: Sep. 9, 2005

(86) PCT No.: PCT/JP2005/016668
§ 371 (c)(1),
(2), (4) Date: Dec. 15, 2006

(87) PCT Pub. No.: WO2006/030717
PCT Pub. Date: Mar. 23, 2006

(65) Prior Publication Data
US 2008/0071060 A1    Mar. 20, 2008

(30) Foreign Application Priority Data
Sep. 13, 2004    (JP) .............................. 2004-265836

(51) Int. Cl.
*B01F 17/04*    (2006.01)
*C08F 2/24*    (2006.01)
*C08L 71/02*    (2006.01)

(52) U.S. Cl. .................. 524/457; 524/458; 524/459; 524/460; 524/461; 558/33; 558/34; 558/36; 558/37; 558/70

(58) Field of Classification Search .............. 524/157, 524/186, 259, 457–461; 558/33, 34, 36, 558/37, 70
See application file for complete search history.

(56) References Cited

U.S. PATENT DOCUMENTS

| | | | | |
|---|---|---|---|---|
| 3,875,202 A | * | 4/1975 | Steckler | ........................ 558/34 |
| 4,939,283 A | * | 7/1990 | Yokota et al. | .................. 558/33 |
| 6,841,655 B1 | * | 1/2005 | Gota et al. | .................... 528/425 |

FOREIGN PATENT DOCUMENTS

| | | |
|---|---|---|
| JP | 49-46291 | 12/1974 |
| JP | 62-011534 | 1/1987 |
| JP | 62-100502 | 5/1987 |
| JP | 62-104802 | 5/1987 |
| JP | 63-214336 | 9/1988 |
| JP | 63-319035 | 12/1988 |
| JP | 01-119335 | 5/1989 |
| JP | 04-053802 | 2/1992 |
| JP | 10-265753 | 10/1998 |
| JP | 2000-063408 | 2/2000 |

* cited by examiner

*Primary Examiner*—Randy Gulakowski
*Assistant Examiner*—Rachel Kahn
(74) *Attorney, Agent, or Firm*—Oblon, Spivak, McClelland, Maier & Neustadt, L.L.P.

(57) ABSTRACT

A surfactant composition has good emulsifiability for monomer(s), and can provide a polymer emulsion (herein after simply called "the emulsion") of good stability while decreasing coagulations of polymer particles in the emulsion. The surfactant composition contains the following components (A) and (B): (A) a reactive surfactant containing at least one polymerizable double-bond group and at least one ionic group in a molecule, and (B) a nitrogen compound insoluble or slightly soluble in ethanol. A weight ratio (A:B) of the component (A) to the component (B) is from 100:0.03 to 100:1.0.

9 Claims, No Drawings

SURFACTANT COMPOSITION

TECHNICAL FIELD

This invention relates to surfactant compositions each of which contains a reactive surfactant having one or more reactive groups and an ethanol-insoluble nitrogen compound, and also to their specific use. It is to be noted that the terms "resin" and "polymer" as used in the present specification and claims are synonymous to each other in most instances.

BACKGROUND ART

Acrylic resins such as polyalkyl methacrylates, styrene resins such as ABS resin, synthetic rubbers, vinyl chloride resins and the like have been conventionally produced by so-called emulsion polymerization. Employed generally as emulsifiers in such emulsion polymerization are anionic surfactants such as alkylsulfates, alkylbenzene sulfates and polyoxyethylene alkyl ether sulfates; and nonionic surfactants such as polyoxyethylene alkyl ethers, polyoxyethylene fatty acid esters and PLURONIC surfactants. Synthetic resin emulsions produced by using the above-described surfactants as emulsifiers are, however, indicated to involve problems in that they tend to undergo substantial foaming due to the emulsifiers; when films are formed from the emulsions, the emulsifiers remain in a form liberated from resins in the films and cause reductions in physical properties of the films, e.g., adhesion, water resistance, weatherability and heat resistance.

In attempts to lessen these problems, numerous reactive surfactants having one or more reactive groups polymerizable with various monomers have been proposed (see, for example, Patent Documents 1-5). However, the reactive surfactants disclosed in Patent Documents 1-4 are all accompanied by problems in emulsifiability, polymerization stability, emulsion stability, post-coating water resistance and so on.

On the other hand, the reactive surfactants disclosed in Patent Documents 5 and 6 are considered to be best ones from the overall standpoint, and are good in the emulsifiability for monomers, the stability of polymer emulsions, and the water resistance of coatings and the like formed from the emulsions. They, however, involve a problem that coagulations of polymer particles abundantly occur during emulsion polymerization.

Patent Document 1: JP-B-49-046291
Patent Document 2: JP-A-62-100502
Patent Document 3: JP-A-62-011534
Patent Document 4: JP-A-63-319035
Patent Document 5: JP-A-04-053802
Patent Document 6: JP-A-62-104802

DISCLOSURE OF THE INVENTION

Object to be Achieved by the Invention

An object to be achieved by the present invention, therefore, is to provide a surfactant composition, which is good in the emulsifiability for monomers and the stability of polymer emulsions (herein after referred to simply as "emulsions") and can decrease coagulations of polymer particles in emulsions.

Means for Achieving the Object

Therefore, the present inventors have proceeded with an extensive investigation, and have found that the inclusion of an ethanol-insoluble nitrogen compound in a reactive surfactant having a specific structure makes it possible to obtain a surfactant composition which is good in the emulsifiability for monomers and the stability of emulsions and can decrease coagulations of polymer particles in emulsions, leading to the present invention.

Described specifically, the present invention provides a surfactant composition comprising the following components (A) and (B): (A) a reactive surfactant having at least one polymerizable double-bond group and at least one ionic group in a molecule, and (B) a nitrogen compound insoluble or slightly soluble in ethanol; and a weight ratio (A:B) of the component (A) to the component (B) being from 100:0.03 to 100:1.0.

In the above-described surfactant composition according to the present invention, the polymerizable double-bond group can preferably be an allyl group or methallyl group; and the component (A) can preferably be a compound represented by the following formula (1):

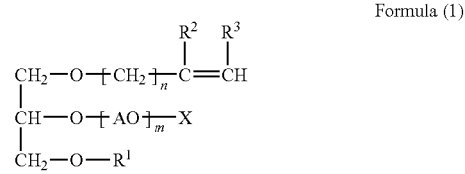

Formula (1)

$$\begin{array}{c} CH_2-O+CH_2+_n\overset{R^2}{\underset{|}{C}}=\overset{R^3}{\underset{|}{CH}} \\ | \\ CH-O+AO+_m X \\ | \\ CH_2-O-R^1 \end{array}$$

wherein $R^1$ represents a $C_{8-20}$ hydrocarbon group, $R^2$ and $R^3$ each represents a hydrogen atom or methyl group, AO represents a $C_{2-4}$ oxyalkylene group, X represents an ionic hydrophilic group, n stands for a number of from 0 to 12, and m stands for a number of from 0 to 100.

In the above-described surfactant composition according to the present invention, it is preferred that in the formula (1), $R^1$ represents a $C_{8-15}$ alkyl group; that in the formula (1), $R^1$ represents a nonylphenyl group or octylphenyl group; that X in the formula (1) is an anionic hydrophilic group represented by $-SO_3M$, $-R^4-SO_3M$, $-R^5-COOM$, $-PO_3M_2$, $-PO_3MH$, or $-CO-R^6-COOM$ wherein M represents a hydrogen atom, an alkali metal atom, an alkaline earth metal atom with a proviso that a half a mole of the alkaline earth metal atom is equivalent to M because an alkaline earth metal atom is generally divalent, $-NH_4$, a quaternary ammonium group derived from an alkylamine or a quaternary ammonium group derived from an alkanolamine, $R^4$ and $R^5$ each represents an alkylene group, and $R^6$ represents a residual group of a dibasic acid or an anhydride thereof; that the component (B) is at least one compound selected from urea, sulfaminate salts and ammonium chloride; and/or that a percentage of oxyethylene groups in $[AO]_m$ in the formula (1) is from 50 to 100 mole %.

The above-described surfactant composition according to the present invention is useful as an emulsifier composition for emulsion polymerization or a resin modifier composition.

Advantageous Effect of the Invention

An advantageous effect of the present invention resides in the provision of a surfactant composition which can decrease coagulations of polymer particles in an emulsion, said coagulations having heretofore occurred when emulsion polymerization was conducted using conventional reactive surfactants, without impairing properties such as the emulsifiability for a monomer or monomers to be polymerized and the stability of a resulting emulsion.

BEST MODES FOR CARRYING OUT THE INVENTION

The component (A), which constitutes the surfactant composition according to the present invention, is a reactive surfactant having at least one polymerizable reactive group (double-bond group) and at least one ionic group in a molecule, and the term "polymerizable reactive group" as used herein means, for example, an allyl group, methallyl group, acrylic group, or methacrylic group. Preferred is a reactive surfactant having an allyl group or methallyl group among such polymerizable reactive groups, and more preferred is a reactive surfactant represented by the following formula (1):

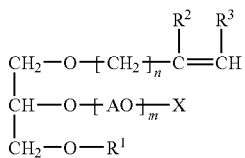

Formula (1)

wherein $R^1$ represents a $C_{8-20}$ hydrocarbon group, $R^2$ and $R^3$ each represents a hydrogen atom or methyl group, AO represents a $C_{2-4}$ oxyalkylene group, X represents an ionic hydrophilic group, n stands for a number of from 0 to 12, and m stands for a number of from 0 to 100.

$R^1$ in the formula (1) represents a $C_{8-20}$ hydrocarbon group. As the hydrocarbon group, an alkyl group, alkenyl group or aryl group is preferred. Examples of the alkyl group include linear and branched octyls, 2-ethylhexyl, secondary octyl, linear and branched nonyls, secondary nonyl, linear and branched decyls, secondary decyl, linear and branched undecyls, secondary undecyl, linear and branched dodecyls, secondary dodecyl, linear and branched tridecyls, secondary tridecyl, linear and branched tetradecyls, secondary tetradecyl, linear and branched hexadecyls, secondary hexadecyl, linear and branched stearyls, linear and branched eicosyls, 2-butyloctyl, 2-butyldecyl, 2-hexyloctyl, 2-hexyldecyl, 2-octyldecyl, 2-hexyldodecyl, 2-octyldodecyl, and monomethyl-branched isostearyl.

Examples of the alkenyl group include octenyl, nonenyl, decenyl, undecenyl, dodecenyl, tetradecenyl, and oleyl.

Examples of the aryl group include xylyl, cumenyl, styryl, trityl, ethylphenyl, propylphenyl, butylphenyl, pentylphenyl, hexylphenyl, heptylphenyl, octylphenyl, nonylphenyl, decylphenyl, undecylphenyl, dodecylphenyl, tridecylphenyl, and tetradecylphenyl.

Among these hydrocarbon groups, especially these alkyl groups and alkenyl groups, $C_{8-15}$ alkyl groups are preferred, $C_{10-14}$ alkyl groups are more preferred, $C_{10-14}$ branched alkyl groups are still more preferred, and $C_{11-13}$ alkyl groups having a branched structure are most preferred. In these aryl groups, on the other hand, $C_{13-16}$ alkylphenyl groups are preferred, octylphenyl and nonylphenyl are more preferred, and nonylphenyl is most preferred.

AO of the formula (1) represents a $C_{2-4}$ oxyalkylene group, and $[AO]_m$ can be obtained in such a manner as addition-polymerizing m moles of an alkylene oxide, for example, ethylene oxide, propylene oxide, butylene oxide or tetrahydrofuran (1,4-butylene oxide). No limitation is imposed on the manner of addition polymerization of an alkylene oxide or the like to be added, and therefore, the manner of addition polymerization can be the homopolymerization of a single alkylene oxide or the like or the random copolymerization, block copolymerization, random/block copolymerization or the like of two or more alkylene oxides or the like. The polymerization degree, m, is from 0 to 100, preferably from 1 to 80, more preferably from 2 to 50, still more preferably from 3 to 20.

Where AO is a single oxyalkylene group or two or more oxyalkylene groups, one or more oxyethylene groups may preferably exist in $[AO]_m$. The percentage of the oxyethylene group or groups in $[AO]_m$ may be more preferably from 50 to 100 mole %, still more preferably from 60 to 100 mole %, yet still more preferably from 80 to 100 mole %, most preferably 100 mole %. If the percentage of oxyethylene group or groups in $[AO]_m$ is lower than 50 mole %, emulsion polymerization with the reactive surfactant of the formula (1) may result in an emulsion of lowered stability in some instances.

In the formula (1), the group represented by the following formula (2) is a reactive group.

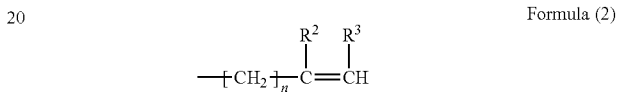

Formula (2)

wherein n stands for a number of from 0 to 12, preferably a number of from 1 to 8, more preferably a number of from 1 to 5, still more preferably a number of from 1 to 3, most preferably 1. On the other hand, $R^2$ and $R^3$ each represents a hydrogen atom or methyl group. Examples of the reactive group represented by the formula (2) include alkenyl groups such as vinyl, 1-propenyl, allyl, methallyl, 2-butenyl, 3-butenyl, 4-pentenyl, 3-methyl-3-butenyl, 5-hexenyl, 8-nonenyl, and 10-dodecenyl. Among these, allyl and methallyl are preferred for their reactivity with other monomers, with allyl being most preferred.

In the formula (1), X represents an ionic hydrophilic group. As ionic hydrophilic groups, anionic hydrophilic groups, cationic hydrophilic groups and the like can be mentioned. Among such groups, particularly preferred are anionic hydrophilic groups, illustrative of which are groups represented by —$SO_3M$, —$R^4$—$SO_3M$, —$R^5$—COOM, —$PO_3M_2$, —$PO_3MH$ or —CO—$R^6$—COOM.

In the formula (X) representing the above-described anionic hydrophilic group, M represents a hydrogen atom, an alkali metal atom such as lithium, sodium or potassium, an alkaline earth metal atom such as magnesium or calcium with a proviso that a half a mole of the alkaline earth metal atom is equivalent to M because an alkaline earth metal atom is generally divalent, —$NH_4$, a quaternary ammonium group derived from an alkylamine such as monomethylamine or dipropylamine, or a quaternary ammonium group derived from an alkanolamine such as monoethanolamine, diethanolamine or triethanolamine.

$R^4$ and $R^5$ each represents an alkylene group such as methylene, ethylene, propylene, butylenes, pentene, pentamethylene or hexamethylene. Among these, $C_{1-4}$ alkylene groups such as methylene, ethylene, propylene and butylene are preferred from the viewpoint of emulsifiability.

$R^6$ represents a residual group of a dibasic acid or an anhydride thereof. Examples of the dibasic acid include saturated aliphatic dicarboxylic acids such as oxalic acid, malonic acid, succinic acid, glutaric acid, adipic acid, pimelic acid, suberic acid, azelaic acid, sebacic acid, undecanoic diacid, dodecanoic diacid, tridecanoic diacid, and tetradecanoic diacid; saturated alicyclic dicarboxylic acids such as cyclopentanedicarboxylic acid, hexahydrophthalic acid, and methylhexahydrophthalic acid; aromatic dicarboxylic acids such as phthalic acid, isophthalic acid, terephthalic acid, tolylenedicarboxylic acid, and xylylenedicarboxylic acid; unsaturated aliphatic dicarboxylic acids such as maleic acid, fumaric acid, itaconic acid, citraconic acid, and mesaconic acid; and unsaturated alicyclic dicarboxylic acids such as tetrahydrophthalic acid, methyltetrahydrophthalic acid, nadic acid (endomethylene-tetrahydrophthalic acid), methylnadic acid, methylbutenyltetrahydrophthalic acid, and methylpentenyltetrahydrophthalic acid. They may also be used in the form of anhydrides.

Among these anionic hydrophilic groups, groups represented by —$SO_3M$, —$PO_3M_2$ or —$PO_3MH$ are preferred, with groups represented by —$SO_3M$ being more preferred. M may preferably be an alkali metal or a quaternary ammonium, with a quaternary ammonium being more preferred.

No particular limitation is imposed on the production process of the component (A) in the present invention. For example, it can be obtained by synthesizing a compound of the formula (1), in which X is a hydrogen atom, and then introducing an ionic hydrophilic group into the synthesis product. As a process for the production of the compound of the formula (1) in which X is a hydrogen atom, the compound can be obtained, for example, by adding an alkylene oxide or the like to a reaction product between a glycidyl ether having a reactive group and an alcohol or a reaction product between a glycidyl ether of an alcohol and an alcohol having a reactive group in a manner known per se in the art. For a ring-opening reaction of the glycidyl ether (epoxy), on the other hand, a catalyst can be used as needed. No particular limitation is imposed on the catalyst to be used, and illustrative are tertiary amines, quaternary ammonium salts, boron trifluoride and ether complex salts thereof, aluminum chloride, barium oxide, sodium hydroxide, and potassium hydroxide.

Upon introducing an —$SO_3M$ group into the compound of the formula (1) in which X is a hydrogen atom, it is possible to use, for example, sulfamic acid, sulfuric acid, sulfuric anhydride, fuming sulfuric acid, chlorosulfonic acid or the like as a reactant. No particular limitation is imposed on the reaction conditions for the above-described reaction. In general, however, the reaction can be conducted at a temperature of from room temperature to 150° C. and a pressure of from environmental pressure to an elevated pressure of 0.5 MPa or so for a reaction time of from 1 to 10 hours or so. Upon formation into a sulfate ester, a catalyst such as urea may also be used as needed. When M in the reaction product is a hydrogen atom, neutralization may be conducted with an alkali such as sodium hydroxide or potassium hydroxide, ammonia, an alkylamine, or an alkanolamine such as monoethanolamine or diethanolamine.

Upon introducing a —$R^4$—$SO_3M$ group into the compound of the formula (1) in which X is a hydrogen atom, it is possible to use, for example, propanesultone, butanesultone or the like as a reactant. No particular limitation is imposed on the reaction conditions for the above-described reaction. In general, however, the reaction can be conducted at a temperature of from room temperature to 100° C. and a pressure of from environmental pressure to an elevated pressure of 0.5 MPa or so for a reaction time of from 1 to 10 hours or so. Upon conducting the reaction, a solvent may be added. When M in the reaction product is a hydrogen atom, neutralization may be conducted with an alkali such as sodium hydroxide or potassium hydroxide, ammonia, an alkylamine, or an alkanolamine such as monoethanolamine or diethanolamine.

Upon introducing a —$R^5$—COOM group into the compound of the formula (1) in which X is a hydrogen atom, it is possible to use, for example, chloroacetic acid ($R^5$: methyl) or chloropropionic acid ($R^5$: ethyl), a salt thereof or the like as a reactant. No particular limitation is imposed on the reaction conditions for the above-described reaction. In general, however, the reaction can be conducted at a temperature of from room temperature to 150° C. and a pressure of from environmental pressure to an elevated pressure of 0.5 MPa or so for a reaction time of from 1 to 10 hours or so. When M in the reaction product is a hydrogen atom, neutralization may be conducted with an alkali such as sodium hydroxide or potassium hydroxide, ammonia, an alkylamine, or an alkanolamine such as monoethanolamine or diethanolamine.

Upon introducing a —$PO_3M_2$ group or —$PO_3MH$ group into the compound of the formula (1) in which X is a hydrogen atom, it is possible to use, for example, diphosphorus pentaoxide, polyphosphoric acid, orthophosphoric acid, phosphorus oxychloride or the like as a reactant. In the above-described reaction, a monophosphate-ester-type compound of the compound of the formula (1) in which X is a hydrogen atom and a diester-type compound (see surfactants (1-g) and (2-g) to be described subsequently herein) of the compound of the formula (1) in which X is a hydrogen atom are obtained as a mixture. They can be separated from each other or, when their separation is difficult, they can be used as they are, that is, in the form of the mixture. No particular limitation is imposed on the reaction conditions for the above-described reaction. In general, however, the reaction can be conducted at a temperature of from room temperature to 150° C. and a pressure of environmental pressure for a reaction time of from 1 to 10 hours or so. When M in the reaction product is a hydrogen atom, neutralization may be conducted with an alkali such as sodium hydroxide or potassium hydroxide, ammonia, an alkylamine, or an alkanolamine such as monoethanolamine or diethanolamine.

Upon introducing a —CO—$R^6$—COOM group into the compound of the formula (1) in which X is a hydrogen atom, it is possible to use, for example, the above-mentioned dibasic acid, an anhydride thereof or the like as a reactant. Illustrative is maleic acid ($R^6$: CH=CH) or phthalic acid ($R^6$: phenyl) or a salt, anhydride or the like thereof. No particular limitation is imposed on the reaction conditions for the above-described reaction. In general, however, the reaction can be conducted at a temperature of from room temperature to 150° C. and a pressure of environmental pressure for a reaction time of from 1 to 10 hours or so. Upon conducting the reaction, an alkali such as sodium hydroxide or potassium hydroxide may be used as a catalyst. When M in the reaction product is a hydrogen atom, neutralization may be conducted with an alkali such as sodium hydroxide or potassium hydroxide, ammonia, an alkylamine, or an alkanolamine such as monoethanolamine or diethanolamine.

The component (B) in the surfactant composition according to the present invention is a nitrogen compound which is insoluble or slightly soluble in ethanol. Specifically, it is a nitrogen compound whose solubility in ethanol of 20° C. is 5 g/100 mL or lower (the amount soluble in 100 mL of ethanol is 5 g or lower). Examples of this nitrogen compound include urea, uric acid, sulfamate salts, ammonium chloride, ammonium nitrate, potassium nitrate, silver nitrate, barium nitrate, ammonium sulfate, ammonium sulfite, potassium nitrite, barium nitrite, and sodium nitrite. Among these, urea, sulfamate salts and ammonium chloride are preferred for their high effect in decreasing coagulations in emulsions. This component (B) can be added at a ratio of from 0.03 to 1 part by weight, preferably from 0.03 to 0.5 part by weight, more preferably from 0.03 to 0.2 part by weight to 100 parts by weight of the component (A), followed by dissolution or dispersion into homogeneity. Use of the component (B) in a proportion lower than 0.03 part by weight cannot bring about the effect of decreasing coagulations of polymer particles when a monomer or monomers are subjected to emulsion polymerization with the surfactant composition containing the component (B). Use of the component (B) in a proportion higher than 1 part by weight, on the other hand, leads to a coating film of poor water resistance when an emulsion obtained by emulsion polymerization of a monomer or monomers with the surfactant composition containing the component (B) is formed into the coating film. Further, inclusion of an ethanol-soluble nitrogen compound in the surfactant composition according to the present invention results in a coating film of poor water resistance when a polymer obtained by emulsion polymerization with the surfactant composition is formed into the coating film.

The component (B) can be added to the component (A) in any desired manner. The time of its addition can be before, during or after the production of the component (A). Examples of the component (B), however, include those reactive to one or more of the raw materials for the component (A). In the case of such a reactive one, it is hence preferred to add the component (B) subsequent to the production of the component (A). Such examples of the component (B) also include those usable as a raw material for the component (A). In such a case, the component (B) may be used before hand in an amount greater than that needed to prepare the component (A) such that the unreacted component (B) may still remain in the resultant component (A).

The surfactant composition according to the present invention can also make a combined use of one or more other components to such extent as not impairing the advantageous effect of the present invention. Illustrative of such other components to be contained are nonionic surfactants such as alcohol ethoxylates, alkyl phenolethoxylates, alkyl polyglycosides, and alkanolamides; anionic surfactants such as alkylbenzenesulfonates, alkylsulfates, alkylether sulfates, α-olefin sulfonates, acylated isethionates, acylated amino acids, acylated polypeptides, fatty acid soaps, and alkyl ether carboxylates; cationic surfactants such as stearyltrimethylammonium, cetyltrimethylammonium, and polydimethyldiallylammonium; ampholytic surfactants such as alkyl carbobetaines, amidopropyl carbobetaine, and imidazolinium betaine; semi-polar surfactants such as alkylamine oxides; solvents such as ethylene glycol, propylene glycol, polyethylene glycol, polyalkylene glycol alkyl ethers, ethanol, and paratoluenesulfonic acid; metal ion scavengers such as aminocarboxylic acids, for example, ethylenediamine tetraacetic acid (EDTA), hydroxyethyl ethylenediamine triacetic acid (HEDTA), nitrilotriacetic acid (NTA), diethylenetriaminepentaacetic acid (DTPA), aspartic acid-N,N-diacetic acid, N-hydroxyethyliminodiacetic acid, and salts thereof, and such as oxycarboxylic acids, for example, citric acid, gluconic acid, glycolic acid and tartaric acid, and salts thereof; inorganic salts such as magnesium sulfate, sodium sulfate (mirabilite), sodium carbonate, sodium bicarbonate, potassium carbonate, sodium silicate, and potassium silicate; alkalis such as sodium hydroxide and potassium hydroxide; alkanolamines such as monoethanolamine, N-methylmonoethanolamine, N-ethylmonoethanolamine, diethanolamine, triethanolamine, monopropanolamine, dipropanolamine, tripropanolamine, 2-amino-2-methyl-1,3-propanediol, and aminoethylethanolamine; dispersants such as sodium polyacrylate and sodium acrylate-olefin copolymers; and thickeners.

The surfactant composition according to the present invention can be used in applications where conventional reactive surfactants have been used, specifically in emulsifiers for emulsion polymerization, dispersants for suspension polymerization, resin modifiers (for the improvement or control of water repellency, hydrophilicity, compatibility, antistatic property, antifogging property, water resistance, adhesion, dyeability, film formability, weatherability, or anti-blocking property), fiber processing aids, non-dripping agents, anti-fouling agents for fibers, and the like.

The emulsion composition according to the present invention for emulsion polymerization comprises the above-described surfactant composition according to the present invention, and can be used as desired in a similar proportion as conventionally-known emulsifiers for emulsion polymerization. For a raw material monomer in an emulsion, the emulsion composition can be generally used in a proportion of preferably from 0.1 to 20 wt. % based on the monomer, more preferably from 0.2 to 10 wt. % based on the monomer, most preferably from 0.5 to 8 wt. % based on the monomer. The emulsion composition according to the present invention for emulsion polymerization can be used in combination with another reactive or non-reactive emulsifier. Although no particular limitation is imposed on the monomer to be emulsion-polymerized, the emulsion composition according to the present invention for emulsion polymerization can be suitably used for monomers employed in the preparation of acrylate-based emulsions, styrene-based emulsions, vinyl-acetate-based emulsions, SBR (styrene/butadiene) emulsion, ABS (acrylonitrile/butadiene/styrene) emulsion, BR (butadiene) emulsion, IR (isoprene) emulsion, and NBR (acrylonitrile/butadiene) emulsion.

Examples of the monomers for acrylate-based emulsions include monomers and monomer mixtures such as (meth)acrylic acid (or (meth)acrylate ester) alone, (meth)acrylic acid ((meth)acrylate ester)/styrene, (meth)acrylic acid ((meth)acrylate ester)/vinyl acetate, (meth)acrylic acid ((meth)acrylate ester)/acrylonitrile, (meth) acrylic acid ((meth)acrylate ester)/butadiene, (meth)acrylic acid ((meth) acrylate ester)/vinylidene chloride, (meth) acrylic acid ((meth)acrylateester)/allylamine, (meth)acrylicacid ((meth) acrylate ester)/vinylpyridine, (meth) acrylic acid ((meth) acrylate ester)/(meth)acrylic acid alkylolamide, (meth) acrylic acid ((meth)acrylate ester)/N,N-dimethylaminoethyl (meth)acrylate, (meth) acrylic acid ((meth)acrylate ester)/N, N-diethylaminoethyl vinyl ether, and cyclohexylmethacrylates.

Examples of monomers for styrene-based emulsions include, in addition to styrene alone, monomer mixtures such as styrene/acrylonitrile, styrene/butadiene, styrene/fumaronitrile, styrene/maleonitrile, styrene/cyanoacrylate ester, styrene/phenylvinyl acetate, styrene/chloromethylstyrene, styrene/dichlorostyrene, styrene/vinylcarbazole, styrene/N, N-diphenylacrylamide, styrene/methylstyrene, acrylonitrile/butadiene/styrene, styrene/acrylonitrile/methylstyrene, styrene/acrylonitrile/vinylcarbazole, styrene/maleic acid.

Examples of monomers for vinyl-acetate-based emulsions include, in addition to vinyl acetate alone, vinyl acetate/styrene, vinyl acetate/vinyl chloride, vinyl acetate/acrylonitrile, vinyl acetate/maleic acid (or maleate ester), vinyl acetate/fumaric acid (or fumarate ester), vinyl acetate/ethylene, vinyl acetate/propylene, vinyl acetate/isobutylene, vinyl acetate/vinylidene chloride, vinyl acetate/cyclopentadiene, vinyl acetate/crotonic acid, vinyl acetate/acrolein, and vinyl acetate/alkyl vinyl ether.

The resin modifier composition according to the present invention comprises the above-described surfactant composition according to the present invention, and the application of the composition can modify one or more of physical properties of a resin. Examples of the physical properties of the resin, which can be modified, include hydrophilicity, water resistance, compatibility, antistatic property, antifogging property, adhesion, dyeability, film formability, weatherability, and anti-blocking property. No particular limitation is imposed on the resin to be modified, and the resin modifier composition is usable for all resins produced by polymerization of the above-described monomers. The resin modifier composition can also be used for polyester resins, polyamide resins, polyimide resins, polyaryl ether resins, epoxy resins, urethane resins and the like, preferably for poly(halogenated olefins) such as polyvinyl chloride and polyvinylidene chloride and poly(α-olefins) such as polyethylene and polypropylene. The resin modifier composition according to the present invention can be coated onto surfaces of molded or otherwise formed resin products, or can be added to resins by incorporation or the like of the resin modifier composition in the resins upon processing the resins. Further, the resin modifier composition according to the present invention can be copolymerized, as one of monomer components of a resin, with the other monomer(s) upon production of the resin such that the component (A) in the resin modifier composition is included in the molecules of the resin to impart a permanent modifying effect such as permanent antistatic property to the resin.

Owing to the inclusion of the component (A) which is a compound containing ether chains in its structure, the resin modifier composition according to the present invention shows excellent compatibility with the monomer or monomers of the resin to be modified. When the component (A) contains oxyalkylene groups, the hydrophilicity of a resin to be modified can be readily controlled by selecting the polymerization degree (m) of the oxyalkylene groups and the kind of the contained oxyalkylene groups as needed depending upon the purpose of the modification and the compatibility with the monomer or monomers of the resin to be modified. The resin modifier composition according to the present invention can, therefore, improve at the same time the compatibility with the monomer or monomers of the resin to be modified and the modifying effect for the resin. The use of the resin modifier composition according to the present invention can provide the modified resins with impart permanent antistatic property and antifogging property.

The proportion of the resin modifier composition according to the present invention can be widely varied depending on the kind(s) of monomer(s) of a resin to be modified, the purpose of the modification, the required properties, and the like. When a resin is produced by adding the resin modifier composition to the constituent monomer(s) of the resin for its modification, the resin modifier composition can be used preferably in a proportion of from 0.1 to 80 wt. % based on the monomer(s). Especially when it is desired to modify a water-insoluble resin of insufficient hydrophilicity into a highly-hydrophilic polymer, it is more preferred to use the resin modifier composition in a proportion of from 1 to 80 wt. % based on the monomer(s) of the resin. For other applications, for example, for improving the water resistance, adhesion, antistatic property, antifogging property, dyeability, film formability, weatherability and/or anti-blocking property of a resin or for providing a resin for a polymer alloy with compatibility, the resin modifier composition may be used preferably in a proportion of from 0.1 to 60 wt. % based on the monomer(s) of the resin.

When the resin modifier composition according to the present invention is used, a crosslinking divinyl compound such as divinylbenzene, ethylene glycol dimethacrylate or methylene bisacrylamide can also be used in combination for monomer(s) as resin raw material(s) within a usual proportion range as desired. When the resin modifier composition according to the present invention is used as an emulsifier for emulsion polymerization or as a resin modifier, the resin can be crosslinked, for example, in the presence of a metallic oxidizing agent.

EXAMPLES

The present invention will herein after be described more specifically based on Examples and Comparative Examples. It is to be noted that in the following Examples, all designations of "%", "part" and "parts" are on a weight basis unless otherwise specifically indicated.

Production Example 1

Into a 3,000-$cm^3$ stainless steel autoclave equipped with a stirrer, thermometer and nitrogen inlet tube, isotridecanol (1,000 g, 5 moles) and as a catalyst, sodium hydroxide (10 g) were charged. After purging the internal atmosphere of the autoclave with nitrogen, allyl glycidyl ether (570 g, 5 moles) were fed at 90° C. Subsequent to the completion of the feeding, aging was effected at 90° C. for 5 hours to obtain a compound (A). To the compound (A) (942 g, 3 moles), ethylene oxide (1,320 g, 30 moles) was fed at 130° C. Subsequent to the completion of the feeding, aging was effected for 2 hours to obtain a compound (B). To the compound (B) (377 g, 0.5 mole), ethylene oxide (440 g, 10 moles) was fed further at 130° C. Subsequent to the completion of the feeding, aging was effected for 2 hours to obtain a compound (C). From the thus-obtained compounds (B) and (C), sodium hydroxide as the catalyst was removed using an adsorbent.

Production Example 2

In a 500-mL, glass-made, four-necked flask equipped with a stirrer, thermometer and nitrogen inlet tube, the compound (A) (157 g, 0.5 mole) obtained in Production Example 1 was placed, followed by cooling to 0 to 5° C. Chlorosulfonic acid (115 g) was added dropwise to the compound (A) from a dropping funnel. Subsequent to the dropwise addition, stirring was conducted at the same temperature for 1 hour, and the resulting HCl was purged out by blowing nitrogen into the flask. Subsequently, the reaction product was neutralized with an aqueous solution of sodium hydroxide to obtain a surfactant (1-a) as a sodium salt.

Production Example 3

After the compound (B) obtained in Production Example 1 was treated with chlorosulfonic acid into a sulfate ester in a similar manner as in Production Example 2, the reaction product was neutralized with an aqueous solution of ammonia to obtain a surfactant (1-b).

Production Example 4

After the compound (C) obtained in Production Example 1 was treated with chlorosulfonic acid into a sulfate ester in a similar manner as in Production Example 2, the reaction product was neutralized with an aqueous solution of ammonia to obtain a surfactant (1-c).

Production Example 5

Into a 3,000-$cm^3$ stainless steel autoclave equipped with a stirrer, thermometer and nitrogen inlet tube, nonylphenol (1,100 g, 5 moles) and as a catalyst, sodium hydroxide (10 g) were charged. After purging the internal atmosphere of the autoclave with nitrogen, allyl glycidyl ether (570 g, 5 moles) were fed at 90° C. Subsequent to the completion of the feeding, aging was effected at 90° C. for 5 hours to obtain a compound (D). To the compound (D) (1,002 g, 3 moles), ethylene oxide (1,320 g, 30 moles) was fed at 130° C. Subsequent to the completion of the feeding, aging was effected for 2 hours to obtain a compound (E). To the compound (E) (387 g, 0.5 mole), ethylene oxide (440 g, 10 moles) was fed further at 130° C. Subsequent to the completion of the feeding, aging was effected for 2 hours to obtain a compound (F). From the thus-obtained compounds (E) and (F), sodium hydroxide as the catalyst was removed using an adsorbent.

Production Example 6

After the compound (D) obtained in Production Example 5 was treated with chlorosulfonic acid into a sulfate ester in a similar manner as in Production Example 2, the reaction product was neutralized with an aqueous solution of potassium hydroxide to obtain a surfactant (1-d).

Production Example 7

After the compound (E) obtained in Production Example 5 was treated with chlorosulfonic acid into a sulfate ester in a similar manner as in Production Example 2, the reaction product was neutralized with an aqueous solution of ammonia to obtain a surfactant (1-e).

Production Example 8

After the compound (F) obtained in Production Example 5 was treated with chlorosulfonic acid into a sulfate ester in a similar manner as in Production Example 2, the reaction product was neutralized with an aqueous solution of ammonia to obtain a surfactant (1-f).

Production Example 9

In a similar flask as in Production Example 2, the compound (E) (464.4 g, 0.6 mole) obtained in Production Example 5 was placed. After diphosphorus pentaoxide (28.4 g, 0.6 mole) was added at 40° C. over 1 hour, aging was effected at 80° C. for 2 hours. Subsequently, the reaction product was neutralized with an aqueous solution of sodium hydroxide to obtain a surfactant (1-g).

Production Example 10

In a similar flask as in Production Example 2, the compound (E) (387 g, 0.5 mole) obtained in Production Example 5 and maleic anhydride (49 g, 0.5 mole) were placed. After they were stirred at 80° C. to conduct esterification, the reaction product was neutralized with an aqueous solution of potassium hydroxide to obtain a surfactant (1-h).

Production Example 11

In a similar flask as in Production Example 2, the compound (E) (387 g, 0.5 mole) obtained in Production Example 5 and propanesultone (61 g, 0.5 mole) were placed. After they were stirred at 80° C. for 5 hours to conduct a reaction, the reaction product was neutralized with an aqueous solution of ammonia to obtain a surfactant (1-i).

Production Example 12

In a similar flask as in Production Example 2, the compound (E) (387 g, 0.5 mole) obtained in Production Example 5 and chloroacetic acid (47.3 g, 0.5 mole) were placed. After they were stirred at 100° C. for 5 hours to conduct a reaction, the reaction product was neutralized with an aqueous solution of sodium hydroxide to obtain a surfactant (1-j).

Production Example 13

Into a 3,000-cm$^3$ stainless steel autoclave equipped with a stirrer, thermometer and nitrogen inlet tube, nonylphenol (1,100 g, 5 moles) and as a catalyst, sodium hydroxide (10 g) were charged. After purging the internal atmosphere of the autoclave with nitrogen, 4-pentenyl glycidyl ether (710 g, 5 moles) were fed at 90° C. Subsequent to the completion of the feeding, aging was effected at 90° C. for 5 hours to obtain a compound (G). To the compound (G) (1,086 g, 3 moles), ethylene oxide (1,320 g, 30 moles) was fed at 130° C. Subsequent to the completion of the feeding, aging was effected for 2 hours to obtain a compound (H). After the compound (H) was treated with chlorosulfonic acid into a sulfate ester in a similar manner as in Production Example 2, the reaction product was neutralized with an aqueous solution of ammonia to obtain a surfactant (1-k).

Production Example 14

In a 3,000-cm$^3$ stainless steel autoclave equipped with a stirrer, thermometer and nitrogen inlet tube, the compound (D) (334 g, 1 mole) obtained in Production Example 5 was placed, and as a catalyst, potassium hydroxide (5 g) was added. Propylene oxide (290 g, 5 moles) was fed at 130° C. Subsequent to the completion of the feeding, aging was effected for 2 hours. After treated with chlorosulfonic acid into a sulfate ester in a similar manner as in Production Example 2, the reaction product was neutralized with an aqueous solution of ammonia to obtain a surfactant (1-1).

Production Example 15

Into a 3,000-cm$^3$ stainless steel autoclave equipped with a stirrer, thermometer and nitrogen inlet tube, the compound (D) (334 g, 1 mole) obtained in Production Example 5 and as a catalyst, potassium hydroxide (5 g) were added. After purging the internal atmosphere of the autoclave with nitrogen, ethylene oxide (352 g, 8 moles) were fed at 130° C. Subsequent to the completion of the feeding, aging was effected for 2 hours. Then, propylene oxide (232 g, 4 moles) was fed further. Subsequent to the completion of the feeding, aging was effected for 2 hours. After treatment with chlorosulfonic acid was then conducted in a similar manner as in Production Example 2 to form a sulfate ester, the reaction product was neutralized with an aqueous solution of ammonia to obtain a surfactant (1-m).

Production Example 16

In a similar flask as in Production Example 2, the compound (E) (387 g, 0.5 mole) obtained in Production Example 5 and urea (0.4 g) were placed, followed by stirring at 50° C. for 1 hour. Sulfamic acid (48.6 g, 0.5 mole) was then added. The resulting mixture was heated to 120° C., at which a reaction was conducted for 8 hours to obtain a surfactant (1-n).

Treatment for the Removal of Ethanol Insolubles

As aliquot (100 parts) of the surfactant (1-a) obtained in Production Example 2 was placed in ethanol (300 mL). After the resulting mixture was stirred until it turned into a homogeneous solution, the resultant solution of the surfactant in ethanol was filtered to completely remove ethanol insolubles. The filtrate was subjected to distillation under reduced pressure to completely remove ethanol. Surfactants (1-b) to (1-n) obtained in Production Examples 3-4 and Production Examples 6-16 were similarly processed. As a result, 14 surfactants free of ethanol insolubles were obtained. In the above processing, no ethanol insolubles were obtained from some of Surfactants (1-a) to (1-n). Nonetheless, all the surfactants were processed to obtain samples absolutely free of ethanol insolubles.

Concerning the thus-obtained surfactants free of ethanol insolubles, one corresponding to the surfactant (1-a) will be identified by (2-a), and similarly, (1-b) by (2-b), (1-c) by (2-c), (1-d) by (2-d), (1-e) by (2-e), (1-f) by (2-f), (1-g) by (2-g), (1-h) by (2-h), (1-i) by (2-i), (1-j) by (2-j), (1-k) by (2-k), (1-l) by (2-l), (1-m) by (2-m), and (1-n) by (2-n), and their structural formulas will be shown below.

It is to be noted that in the following structural formulas, EO represents $-CH_2CH_2O-$ and PO represents $-C_3H_6O-$.

(1-a) and (2-a)

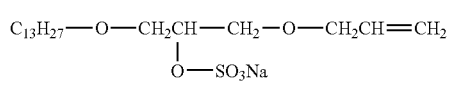

(1-b) and (2-b)

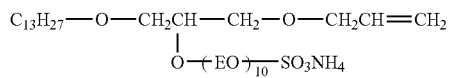

(1-c) and (2-c)

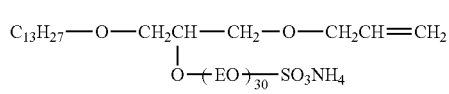

(1-d) and (2-d)

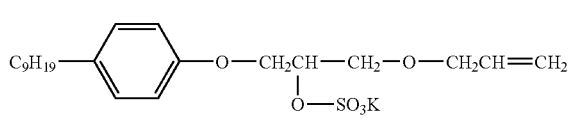

(1-e) and (2-e), (1-n) and (2-n)

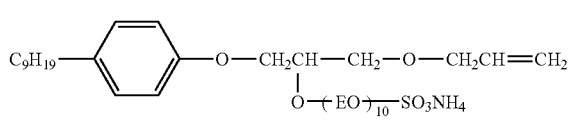

(1-f) and (2-f)

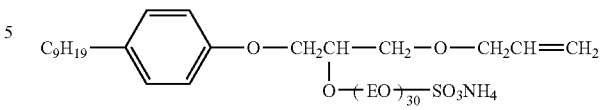

(1-g) and (2-g) Mixture of the following two compounds:

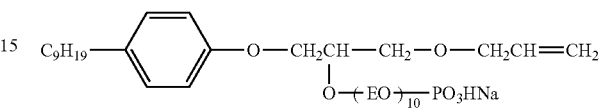

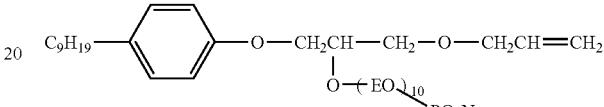

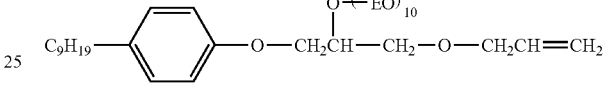

(1-h) and (2-h)

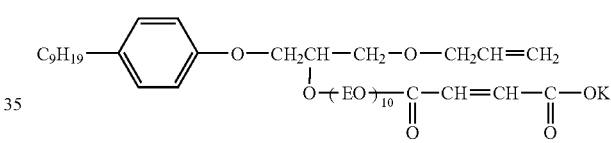

(1-i) and (2-i)

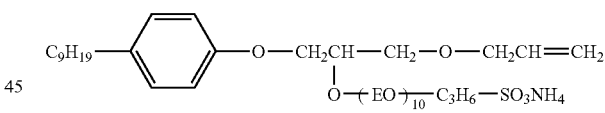

(1-j) and (2-j)

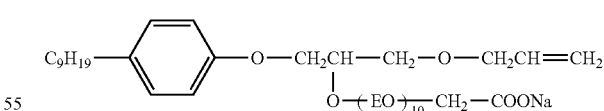

(1-k) and (2-k)

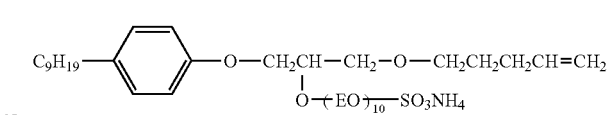

(1-1) and (2-1)

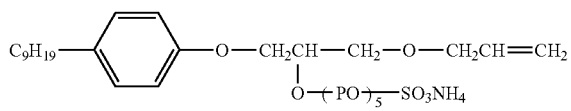

(1-m) and (2-m)

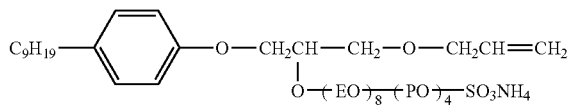

Example

Mixing of the Component (B)

In a 500-mL, glass-made, four-necked flask equipped with a stirrer, thermometer and nitrogen inlet tube, the sample (200 g) of Surfactant (2-a) was placed. Under a nitrogen atmosphere, the sample was heated to 80° C., followed by the addition of a fine powder of the corresponding ethanol-insoluble nitrogen compound in a predetermined amount. Until the nitrogen compound was fully dissolved or dispersed, stirring was continued still at 80° C. to obtain a surfactant composition 1 as an invention product. Similarly, the samples of Surfactants (2-b) to (2-m) were also processed to obtain surfactant compositions 2 to 13 as invention products. The kinds and amounts of the nitrogen compounds are shown in Table 1. It is to be noted that with respect to the surfactant (1-n), ethanol insolubles accounted for 0.12%. As a result of an analysis, those ethanol insolubles consisted of urea (0.08%) and sulfamic acid (0.04%). Therefore, the surfactant (1-n) from which the ethanol insolubles had not been removed was used, as it was, as a surfactant composition 14 of the present invention in tests.

Comparative Example

The surfactants (2-a) to (2-n) obtained in the above-described Production Examples (not added with any nitrogen compound) were provided as comparative products 1 to 14. In a similar manner as in the Example, aliquots (0.01 part and 1.5 parts) of urea were added to aliquots of Surfactant (2-b) to provide comparative products 15 and 16, and urea (0.1 part) was added to Surfactant (3-a) as a non-reactive surfactant to provide a comparative product 17. Details of these comparative products are shown in Table 1-2.

Use Example

Use Example of the Surfactant Compositions According to the Present Invention Emulsion Polymerization-1

To determine the performance of the surfactant compositions of the present invention as emulsifiers for emulsion polymerization, a mixture of 2-ethylhexyl acrylate/acrylic acid was subjected as a monomer to emulsion polymerization by the below-described polymerization procedure while using the surfactant compositions. By the below-described assessment methods, the resultant emulsions were each measured for the amount of coagulations, mechanical stability, foaming tendency, and the water resistance of a polymer film obtained from the emulsion. The results are shown in Table 2-1.

Polymerization Procedure

Into a reaction vessel equipped with a reflux condenser, stirrer, dropping funnel and thermometer, deionized water (61.3 g), an aliquot (0.5 g) of a surfactant composition according to the present invention (an invention product 1) and a mixed monomer (2-ethylhexyl acrylate/acrylic acid=97/3, 10 g) were charged. After the system was purged with nitrogen gas, the contents were heated to 75° C. and were then mixed and emulsified for 30 minutes. After ammonium persulfate (0.2 g) was placed as an initiator in the reaction vessel, a mixed solution consisting of water (38.7 g), the mixed monomer (90 g) and the emulsifier (2 g) was added dropwise over 3 hours into the reaction vessel maintained at 75° C. to perform a polymerization reaction. Subsequent to the completion of the dropwise addition, aging was effected at 75° C. for 1 hour to obtain an emulsion. From the remaining surfactant compositions of the present invention (invention products 2 to 14), emulsions were also obtained, respectively, in a similar manner as described above.

Comparative Use Example

Use Example of the Surfactants (Compositions) as Comparative Products

The procedure of the above-described Use Example was followed except that the surfactants 1 to 14 and the surfactant compositions 15 to 17 as the comparative products were used instead of the surfactant compositions according to the present invention. Similarly to the above-described Use Example, the resultant emulsions were each measured for the amount of coagulations, mechanical stability, foaming tendency, and the water resistance of a polymer film obtained from the emulsion. The results are shown in Table 2-2.

Assessment Methods

Particle Size

Measured at 25° C. by using an electrophoretic light-scattering spectrophotometer ("ELS-800", manufactured by Otsuka Electronics Co., Ltd.)

Amount of Coagulations

Each emulsion after its polymerization was filtered through a 325-mesh woven metal wire. The filtration residue was washed with water, and was then dried at 105° C. for 2 hours. Its weight was measured and expressed in terms of % based on the solid content.

Mechanical Stability

After each emulsion was stirred at 2,000 rpm for 2 minutes in a vacuum emulsifying mixer, the amount of coagulations was measured by the above-described method to assess the mechanical stability.

Foaming Tendency

Each emulsion was diluted two-fold with water. An aliquot (20 mL) of the thus-diluted emulsion was placed in a 100-mL graduated test tube, and was then vigorously shaken up and down for 10 seconds. The volume of foams was measured shortly after the shaking and also 5 minutes later.

Water Resistance

Each emulsion was coated on a glass plate to prepare a polymer film of 0.2 mm in thickness. The polymer film was dipped in water of 50° C. to blush the same. The time until 8-point characters became no longer recognizable through the polymer film was clocked to assess the water resistance. The following assessment standards were followed.

A: 24 hours or longer
B: 5 hours to shorter than 24 hours
C: 1 hour to shorter than 5 hours
D: Shorter than 1 hour

TABLE 1-1

| Invention product | Surfactant (100 parts) | Surfactant composition | | | Ethanol insolubles (parts) |
|---|---|---|---|---|---|
| | | Nitrogen compound 1 (part) | Nitrogen compound 2 (part) | Nitrogen compound 3 (part) | |
| 1 | 2-a | Ammonium sulfate 0.3 | — | — | 0.3 |
| 2 | 2-b | Urea 0.15 | — | — | 0.15 |
| 3 | 2-c | Ammonium sulfamate 0.08 | — | — | 0.08 |
| 4 | 2-d | Ammonium chloride 0.8 | — | — | 0.8 |
| 5 | 2-e | Urea 0.1 | Ammonium sulfamate 0.05 | — | 0.15 |
| 6 | 2-f | Potassium nitrate 0.2 | Potassium sulfamate 0.2 | — | 0.4 |
| 7 | 2-g | Urea 0.1 | — | — | 0.1 |
| 8 | 2-h | Urea 0.1 | — | — | 0.1 |
| 9 | 2-i | Ammonium sulfate 0.1 | — | — | 0.1 |
| 10 | 2-j | Urea 0.05 | Ammonium chloride 0.05 | Ammonium sulfate 0.05 | 0.15 |
| 11 | 2-k | Urea 0.05 | Sodium nitrite 0.03 | — | 0.08 |
| 12 | 2-l | Urea 0.05 | Ammonium nitrate 0.05 | — | 0.1 |
| 13 | 2-m | Potassium sulfamate 0.5 | Ammonium chloride 0.05 | — | 0.55 |
| 14 | 2-n | — | — | — | 0.12 |

TABLE 1-2

| Comparative product | Surfactant (100 parts) | Surfactant (composition) | | | Ethanol insolubles (parts) |
|---|---|---|---|---|---|
| | | Nitrogen compound 1 (part(s)) | Nitrogen compound 2 (part) | Nitrogen compound 3 (part) | |
| 1 | 2-a | — | — | — | 0 |
| 2 | 2-b | — | — | — | 0 |
| 3 | 2-c | — | — | — | 0 |
| 4 | 2-d | — | — | — | 0 |
| 5 | 2-e | — | — | — | 0 |
| 6 | 2-f | — | — | — | 0 |
| 7 | 2-g | — | — | — | 0 |
| 8 | 2-h | — | — | — | 0 |
| 9 | 2-i | — | — | — | 0 |
| 10 | 2-j | — | — | — | 0 |
| 11 | 2-k | — | — | — | 0 |
| 12 | 2-l | — | — | — | 0 |
| 13 | 2-m | — | — | — | 0 |
| 14 | 2-n | — | — | — | 0 |
| 15 | 2-b | Urea 0.01 | — | — | 0.01 |
| 16 | 2-b | Urea 1.5 | — | — | 1.5 |
| 17 | 3-a | Urea 0.1 | — | — | 0.1 |

In Table 1,
*Each nitrogen compound and ethanol insolubles are relative to 100 parts of the corresponding surfactant.
*The structure of (3-a), which is a non-reactive surfactant, is shown below.

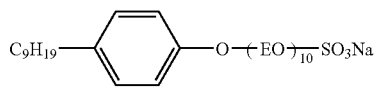

(3-a)

TABLE 2-1

| Invention product | Particle size (μm) | Amount of coagulations (%) | Mechanical stability (%) | Foaming tendency (mL) | | Water resistance |
|---|---|---|---|---|---|---|
| | | | | Shortly after | 5 minutes later | |
| 1 | 0.11 | 0.12 | 2.4 | 29 | 8 | A |
| 2 | 0.09 | 0.04 | 2.0 | 30 | 6 | A |
| 3 | 0.08 | 0.05 | 2.6 | 27 | 5 | A |
| 4 | 0.11 | 0.18 | 2.3 | 31 | 10 | A |
| 5 | 0.13 | 0.06 | 2.1 | 30 | 7 | A |
| 6 | 0.12 | 0.09 | 2.7 | 29 | 4 | A |
| 7 | 0.11 | 0.08 | 3.2 | 32 | 11 | A |
| 8 | 0.10 | 0.13 | 2.8 | 33 | 7 | A |
| 9 | 0.08 | 0.09 | 2.5 | 28 | 8 | A |
| 10 | 0.09 | 0.12 | 2.1 | 29 | 5 | A |
| 11 | 0.10 | 0.08 | 2.7 | 29 | 8 | A |
| 12 | 0.09 | 0.08 | 5.7 | 31 | 11 | A |
| 13 | 0.08 | 0.05 | 4.4 | 35 | 9 | A |
| 14 | 0.08 | 0.03 | 2.1 | 32 | 8 | A |

TABLE 2-2

| Comparative product | Particle size (μm) | Amount of coagulations (%) | Mechanical stability (%) | Foaming tendency (mL) | | Water resistance |
|---|---|---|---|---|---|---|
| | | | | Shortly after | 5 minutes later | |
| 1 | 0.12 | 0.53 | 11.9 | 28 | 6 | A |
| 2 | 0.13 | 0.58 | 13.1 | 30 | 7 | A |
| 3 | 0.12 | 0.65 | 12.0 | 26 | 5 | A |
| 4 | 0.12 | 0.54 | 14.8 | 33 | 11 | A |
| 5 | 0.11 | 0.63 | 12.5 | 32 | 8 | A |
| 6 | 0.10 | 0.66 | 11.4 | 35 | 12 | A |
| 7 | 0.14 | 0.78 | 14.5 | 33 | 10 | A |
| 8 | 0.11 | 0.82 | 12.8 | 30 | 8 | A |
| 9 | 0.14 | 0.61 | 13.7 | 32 | 9 | A |
| 10 | 0.12 | 0.84 | 14.6 | 35 | 11 | A |
| 11 | 0.11 | 0.65 | 12.5 | 37 | 14 | A |
| 12 | 0.13 | 0.59 | 16.1 | 31 | 9 | A |
| 13 | 0.10 | 0.55 | 13.6 | 35 | 10 | A |
| 14 | 0.12 | 0.58 | 15.3 | 38 | 12 | A |
| 15 | 0.13 | 0.56 | 10.0 | 36 | 13 | A |
| 16 | 0.12 | 0.23 | 8.2 | 32 | 10 | C |
| 17 | 0.11 | 0.08 | 3.8 | 112 | 86 | D |

Comparing the use of the conventional reactive surfactants (the comparative products 1 to 16) with the use of the invention products, no difference is observed in the basic performance as emulsions because their test results on particle size, foaming tendency and water resistance were equal. From the results of the amount of coagulations and mechanical stability, on the other hand, it is appreciated that, when the invention products were used, coagulations clearly decreased and mechanical stability was improved. It is also appreciated that the comparative product 17 making use of the non-reactive surfactant was significantly inferior in the water resistance of films compared with the use of the invention products.

The invention claimed is:

1. A surfactant composition comprising:
   (A) a reactive surfactant having at least one polymerizable double-bond group and at least one ionic group in a molecule, and
   (B) a sulfaminate salt insoluble or slightly soluble in ethanol; wherein
   a weight ratio (A:B) of said component (A) to said component (B) is from 100:0.03 to 100:1.0.

2. The surfactant composition according to claim 1, wherein said at least one polymerizable double-bond group is an allyl group or a methallyl group.

3. The surfactant composition according to claim 1, wherein said component (A) is a compound represented by formula (1):

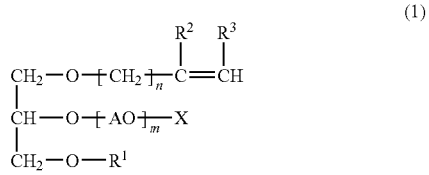

wherein $R^1$ represents a $C_{8-20}$ hydrocarbon group, $R^2$ and $R^3$ each represents a hydrogen atom or methyl group, AO represents a $C_{2-4}$ oxyalkylene group, X represents an ionic hydrophilic group, n stands for a number of from 0 to 12, and m stands for a number of from 0 to 100.

4. The surfactant composition according to claim 3, wherein in said formula (1), $R^1$ represents a $C_{8-15}$ alkyl group.

5. The surfactant composition according to claim 3, wherein in said formula (1), $R^1$ represents a nonylphenyl group or octylphenyl group.

6. The surfactant composition according to claim 3, wherein X in said formula (1) is an anionic hydrophilic group represented by —$SO_3M$, —$R^4$—$SO_3M$, —$R^5$—COOM, —$PO_3M_2$, —$PO_3MH$, or —CO—$R^6$—COOM wherein M represents a hydrogen atom, an alkali metal atom, an alkaline earth metal atom with a proviso that a half a mole of said alkaline earth metal atom is equivalent to M because an alkaline earth metal atom is generally divalent, —$NH_4$, a quaternary ammonium group derived from an alkylamine or a quaternary ammonium group derived from an alkanolamine, $R^4$ and $R^5$ each represents an alkylene group, and $R^6$ represents a residual group of a dibasic acid or an anhydride thereof.

7. The surfactant composition according to claim 3, wherein a percentage of oxyethylene groups in $[AO]_m$ in said formula (1) is from 50 to 100 mole %.

8. An emulsifier composition for emulsion polymerization, comprising the surfactant composition according to claim 1.

9. A resin modifier composition comprising the surfactant composition according to claim 1.

* * * * *